US012757865B2

(12) United States Patent
Yang

(10) Patent No.: US 12,757,865 B2
(45) Date of Patent: Oct. 13, 2026

(54) PET CUSHION SUITABLE FOR VEHICLE SEAT

(71) Applicant: Jing Yang, Shenzhen (CN)

(72) Inventor: Jing Yang, Shenzhen (CN)

( * ) Notice: Subject to any disclaimer, the term of this patent is extended or adjusted under 35 U.S.C. 154(b) by 0 days.

(21) Appl. No.: 19/023,667

(22) Filed: Jan. 16, 2025

(65) Prior Publication Data

US 2026/0060203 A1 Mar. 5, 2026

(30) Foreign Application Priority Data

Aug. 28, 2024 (CN) ......................... 202422111572.9

(51) Int. Cl.
*A01K 1/02* (2006.01)

(52) U.S. Cl.
CPC .......... *A01K 1/0272* (2013.01); *A01K 1/0254* (2013.01)

(58) Field of Classification Search
CPC .... A01K 1/0272; A01K 1/0281; A01K 1/029; A01K 1/0157; A01K 1/0353; B60N 2/60; B60N 2/6009; B60N 2/6018; B60N 2/6027; B60N 2/6036
See application file for complete search history.

(56) References Cited

U.S. PATENT DOCUMENTS

| | | | | |
|---|---|---|---|---|
| 9,845,033 | B1 | 12/2017 | Umlauf | |
| 2018/0359990 | A1* | 12/2018 | Graham | A01K 1/0272 |
| 2022/0061264 | A1* | 3/2022 | Pan | B60N 2/6009 |

FOREIGN PATENT DOCUMENTS

| | | | | | |
|---|---|---|---|---|---|
| CN | 213486305 | U * | 6/2021 | A01K 1/0272 |
| CN | 219077071 | U | 5/2023 | |
| KR | 20230060038 | A * | 5/2023 | A01K 1/0272 |
| WO | WO-2021145688 | A1 * | 7/2021 | A01K 1/0272 |

OTHER PUBLICATIONS

English translation of CN_213486305_U (Year: 2021).*
English translation of KR_20230060038_A (Year: 2023).*
English translation of WO_2021145688_A1 (Year: 2021).*

* cited by examiner

*Primary Examiner* — Peter M Poon
*Assistant Examiner* — Danielle A Clerkley
(74) *Attorney, Agent, or Firm* — Nicholas Makridakis

(57) ABSTRACT

The present invention discloses a pet cushion suitable for a vehicle seat. A plurality of bottom cushions are arranged along a parallel direction of a vehicle seat, first side cushions are integrally arranged on front and rear sides of the bottom cushion, and two adjacent first side cushions are detachably connected; second side cushions are integrally arranged on left and right sides of the bottom cushions; the bottom cushion and the first side cushion are detachably connected by right-angle sides at right angles to each other, and the first side cushion and the second side cushion are detachably connected by right-angle sides at right angles to each other; and connections among the plurality of bottom cushions and connections between the bottom cushion and the first side cushion and the second side cushion are provided with folding parts.

18 Claims, 8 Drawing Sheets

PET CUSHION SUITABLE FOR VEHICLE SEAT

CROSS-REFERENCE TO RELATED APPLICATION

This application claims the priority of Chinese Application No. 202422111572.9, filed on Aug. 28, 2024, the disclosure of which is incorporated in its entirety by reference herein.

TECHNICAL FIELD

The present invention relates to the technical field of pet cushions, and in particular, to a pet cushion suitable for a vehicle seat.

BACKGROUND

A pet cushion is a seat cushion designed for pets. Especially in a vehicle riding environment, a pet cushion is laid on a vehicle seat to provide a comfortable riding environment for pets and protect the vehicle seat from damage by the hair, paw prints and stains of the pets.

There are various types of pet cushions available on the market. For example, the Chinese Patent Application No.: CN219077071U entitled "PET PROTECTION CUSHION FOR AUTOMOBILE" includes a cushion body, a front hem arranged on one side of the cushion body, a back cushion and side hems. When in use, the pet protection cushion is firstly unfolded, the side hems are separated from the cushion body by a metal male buckle and a metal female buckle, and the protection cushion is laid on a back row of a vehicle seat and is sleeved on a headrest of the seat by an elastic band. Then the side hem is inserted into two sides of the seat, and the front hem is attached to a bottom of the seat by a magnetic strip, thus completing the mounting of the pet protection cushion on the vehicle seat.

Although a pet cushion in the prior art can be placed on a vehicle seat for pets to use, the pet cushion still has the following defects.

According to the existing pet cushion, a bottom cushion is usually designed as an integral cushion and cannot be folded, and a cushion cavity provided by the pet cushion is fixed and cannot be adjusted for pets of different numbers or sizes. As a result, after the pet cushion is placed on a back seat of a vehicle, there is no space for people to sit, which causes inconvenience to users. Some pet cushions are also designed as a spliced cushion, which is formed by splicing several cushions together. The size of the cushion cavity is adjusted by increasing or decreasing the number of splicing cushions. However, the bottom cushion and side cushions of the spliced cushion need to be manually spliced, which has relatively complex operations, and frequent disassembly and assembly reduces the service life of the pet cushion.

SUMMARY

To overcome the defects in the prior art, an objective of the present invention is to provide a pet cushion suitable for a vehicle seat.

The objective of the present invention is achieved by adopting the following technical solution. A pet cushion suitable for a vehicle seat includes a bottom cushion, a first side cushion and a second side cushion, a plurality of the bottom cushions are arranged along a parallel direction of a vehicle seat, the first side cushions are arranged in one-to-one correspondence with the bottom cushions and are integrally arranged on front and rear sides of the bottom cushions, two adjacent first side cushions are detachably connected, and the second side cushions are integrally arranged on left and right sides of the bottom cushions;

the bottom cushion and the first side cushion are detachably connected by right-angle sides at right angles to each other, and the first side cushion and the second side cushion are detachably connected by right-angle sides at right angles to each other; connections among the plurality of bottom cushions and connections between the bottom cushion and the first side cushion and the second side cushion are provided with folding parts, and unfolding or folding is achieved by the folding parts to form a cushion cavity with a set spatial area and an upward opening.

Further, the folding parts include a first folding part, a second folding part and a third folding part, the first folding part is arranged at a connection between two adjacent bottom cushions, the second folding part is arranged at a connection between the first side cushion and the front and rear sides of the bottom cushion, the third folding part is arranged at a connection between the second side cushion and the left and right sides of the bottom cushion, and the first folding part, the second folding part and the third folding part are arranged as soft layers.

Further, when the plurality of bottom cushions are in an unfolded state, the first side cushion is folded to be perpendicular to the bottom cushion by the second folding part, the second side cushion is folded to be perpendicular to the bottom cushion by the third folding part, and the first side cushion and the second side cushion are connected by right-angle sides at right angles to each other.

Further, when the plurality of bottom cushions are folded to be in a mutually perpendicular state by the first folding part, the plurality of first side cushions are folded to be in a perpendicular or overlapping state with the bottom cushion by the second folding part, and the second side cushions are folded to be in a perpendicular or overlapping state with the bottom cushion by the third folding part.

Further, a first connecting member is arranged between two adjacent first side cushions; a second connecting member is arranged between right-angle sides of the bottom cushion and the first side cushion at right angles to each other, and a third connecting member is arranged between right-angle sides of the first side cushion and the second side cushion at right angles to each other.

Further, the first connecting member, the second connecting member and the third connecting member are configured as zippers, buttons, hook and loop fasteners or magnets.

Further, an inner side surface of the pet cushion contacting a pet is provided with a waterproof layer, and the interior of the pet cushion is filled with a cushioning material.

Further, a surface of the bottom cushion contacting a vehicle seat is provided with an anti-slip layer.

Further, the first side cushion is provided with a storage pocket and a window with a grid.

Further, outer sides of the bottom cushion, the first side cushion and the second side cushion are all provided with fasteners and/or connecting belts, and a handle is provided on a side of the first side cushion connected to the bottom cushion.

Compared with the conventional technology, the present invention has the following beneficial effects.

According to the pet cushion provided in the embodiment of the present application, the bottom cushion, the first side cushion and the second side cushion are integrally connected, and the connections among the plurality of bottom cushions and the connections between the bottom cushion and the first side cushion and the second side cushion are provided with folding parts, so that the pet cushion is unfolded or folded along the folding parts. Compared with the conventional implementation means where a bottom cushion cannot be folded or a plurality of cushions need to be spliced and formed, the embodiment of the present application can improve the use convenience based on maintaining the integrity of the integral forming of the pet cushion, is easier and labor-saving in assembly, use and storage without repeated assembly, and thus has longer service life.

Moreover, when folding the pet cushion, a user can determine a spatial area of a cushion cavity of the pet cushion by selecting the number of bottom cushions to be unfolded and laid, so as to meet a requirement of the user to freely switch to cushion cavities with different spatial areas. Then the bottom cushion and the right-angle side of the first side cushion, as well as the right-angle side of the first side cushion and the right-angle side of the second side cushion are connected to complete the assembly of the pet cushion. The operation is simple and convenient, and after the cushion is folded, people and pets can ride together in the back seat of the vehicle.

REFERENCE NUMERALS

- 1: pet cushion;
- 10: bottom cushion;
- 20: first side cushion; 21: window;
- 30: second side cushion;
- 40: cushion cavity;
- 50: first folding part; 51: second folding part; 52: third folding part;
- 60: first connecting member; 61: second connecting member; 62: third connecting member; 63: fastener; 64: connecting belt; and
- a: vehicle seat.

DETAILED DESCRIPTION OF EMBODIMENTS

The present invention is further described below in conjunction with the accompanying drawings and specific implementations. It should be noted that, under the premise of no conflict, the various embodiments or technical features described below can be arbitrarily combined to form a new embodiment.

Figure 1:
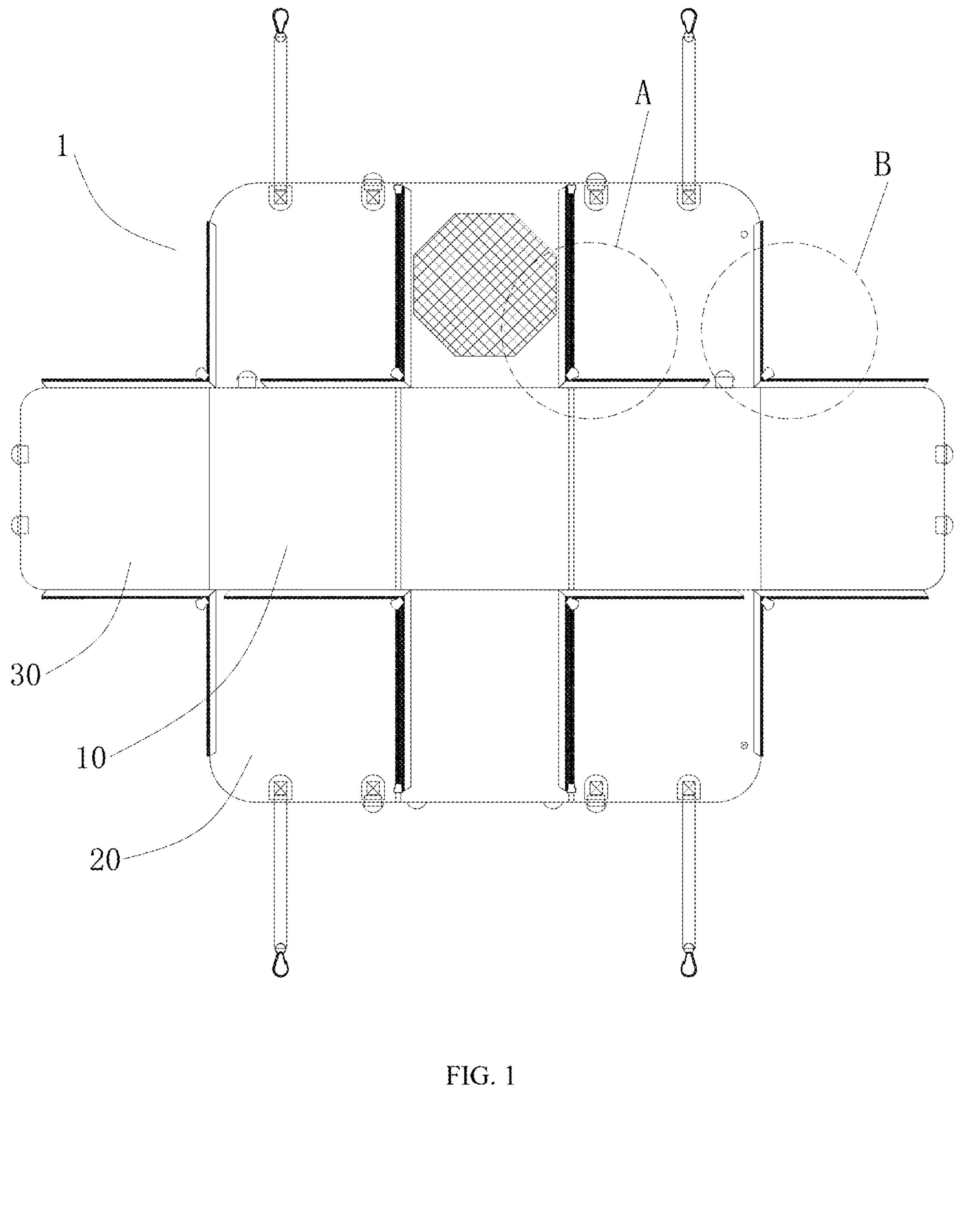
FIG. 1 is an unfolded state diagram of a pet cushion according to a preferred embodiment of the present invention.
Figure 2:
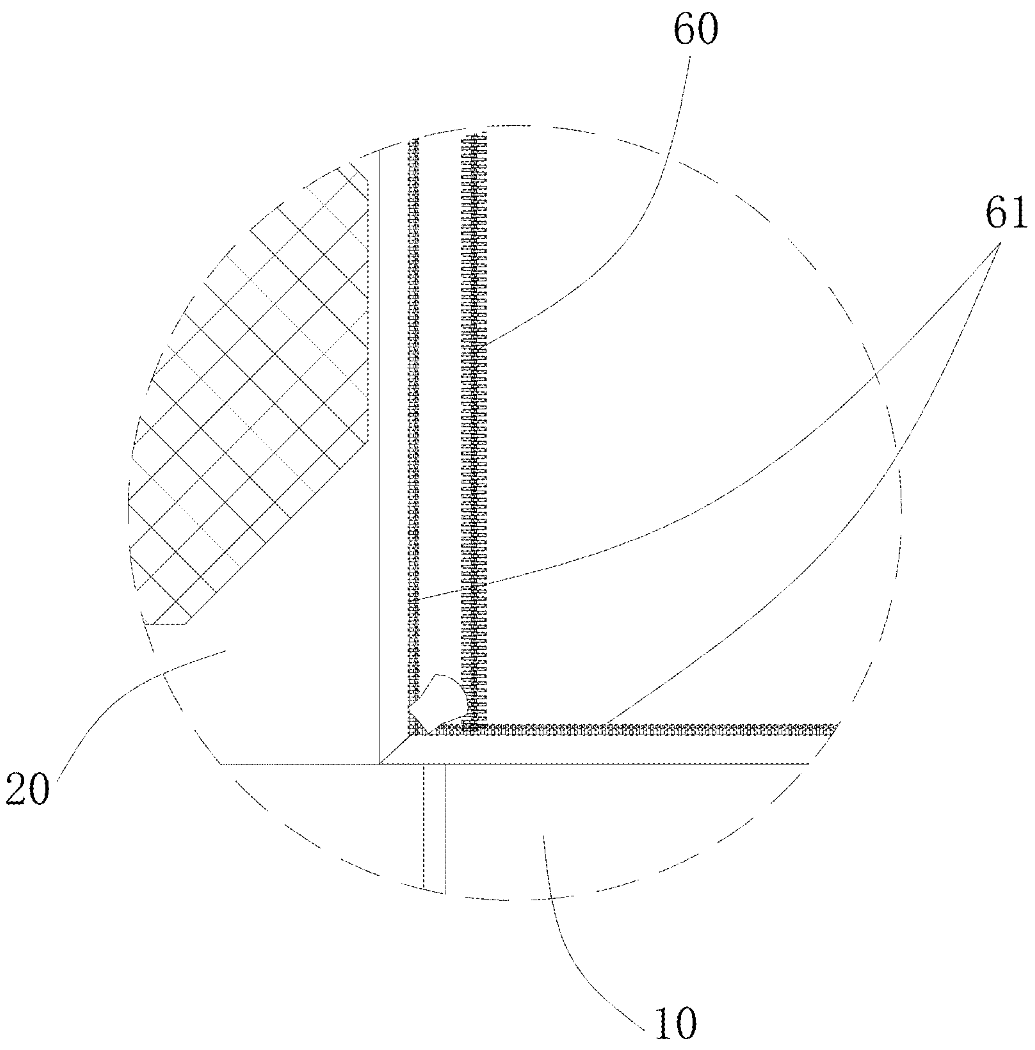
FIG. 2 is an enlarged schematic diagram of A in FIG. 1.
Figure 3:
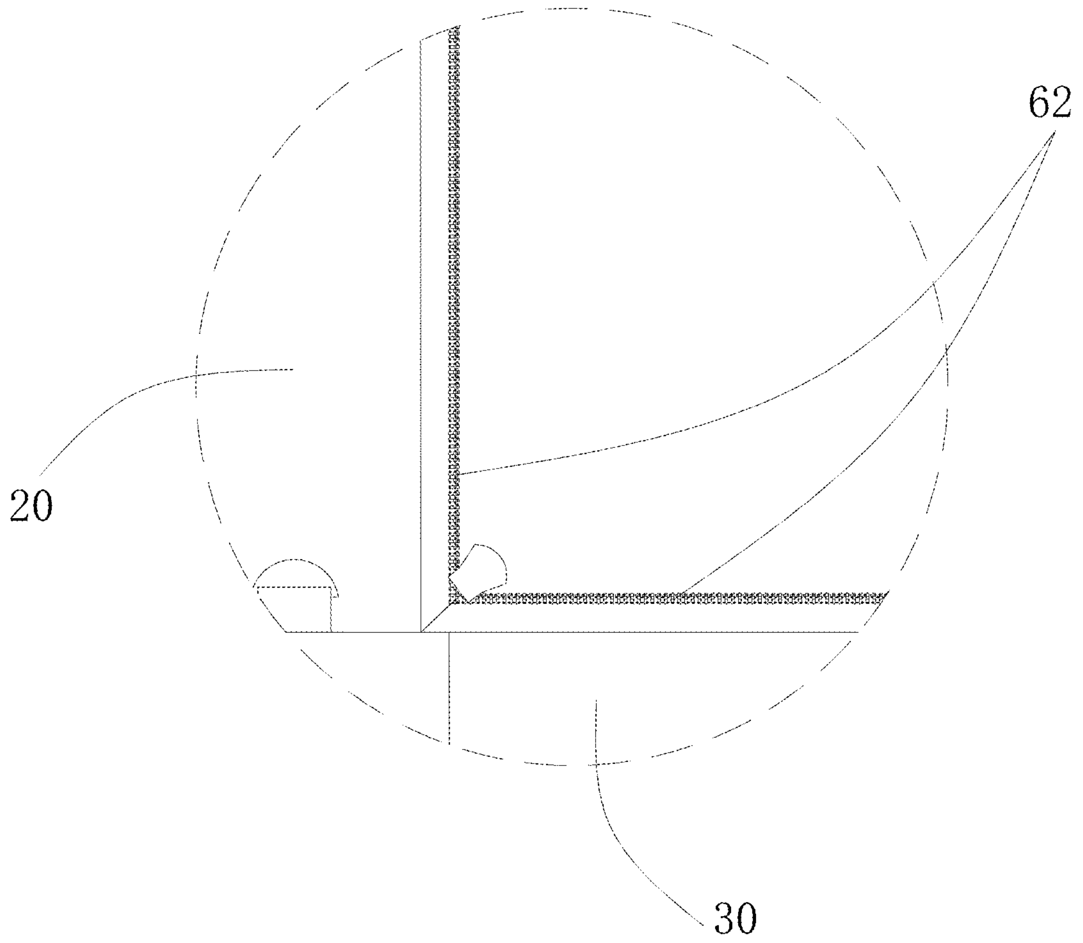
FIG. 3 is an enlarged schematic diagram of B in FIG. 1.
Figure 4:
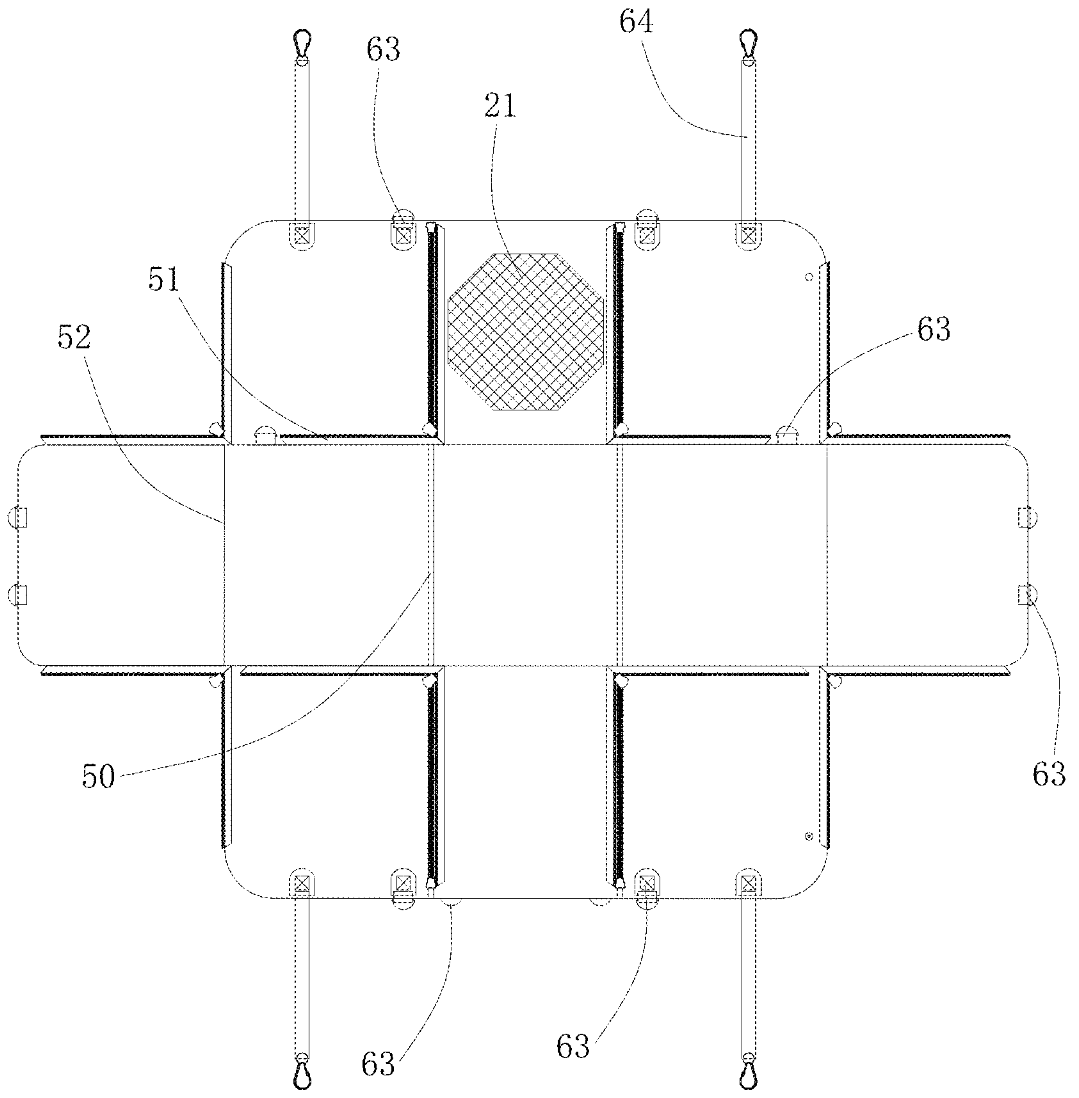
FIG. 4 is another unfolded state diagram of a pet cushion according to a preferred embodiment of the present invention.
Figure 5:
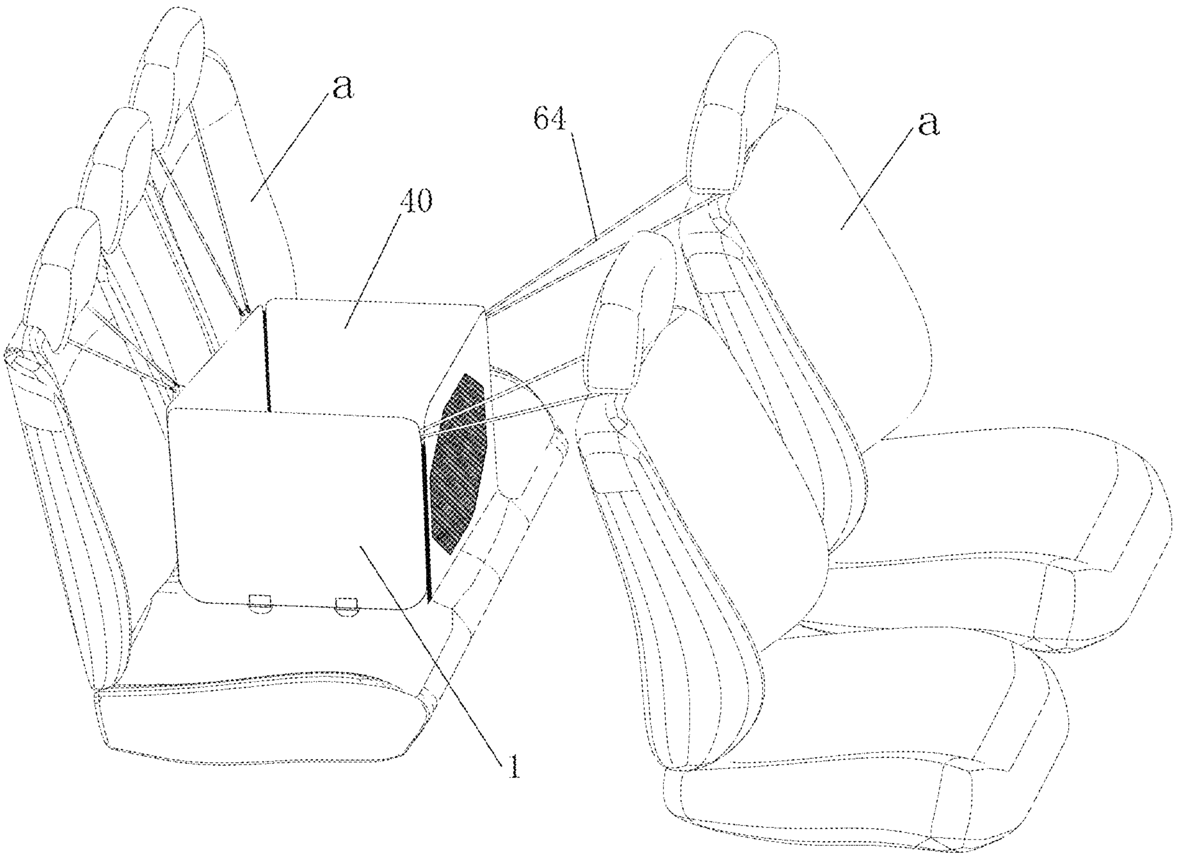
FIG. 5 is a use state diagram of a cushion cavity of a pet cushion according to a preferred embodiment of the present invention folded into a size space of one vehicle seat.
Figure 6:
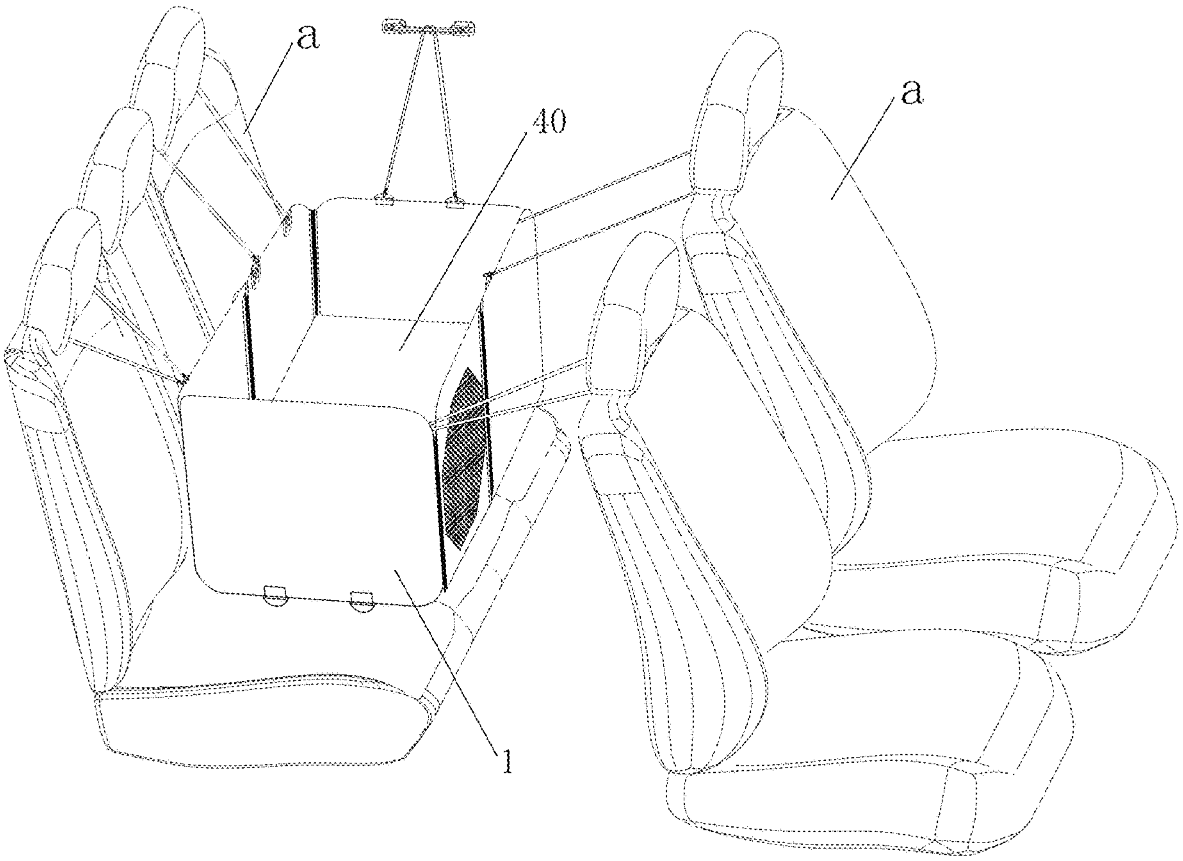
FIG. 6 is a use state diagram of a cushion cavity of a pet cushion according to a preferred embodiment of the present invention folded into a size space of two vehicle seats.
Figure 7:
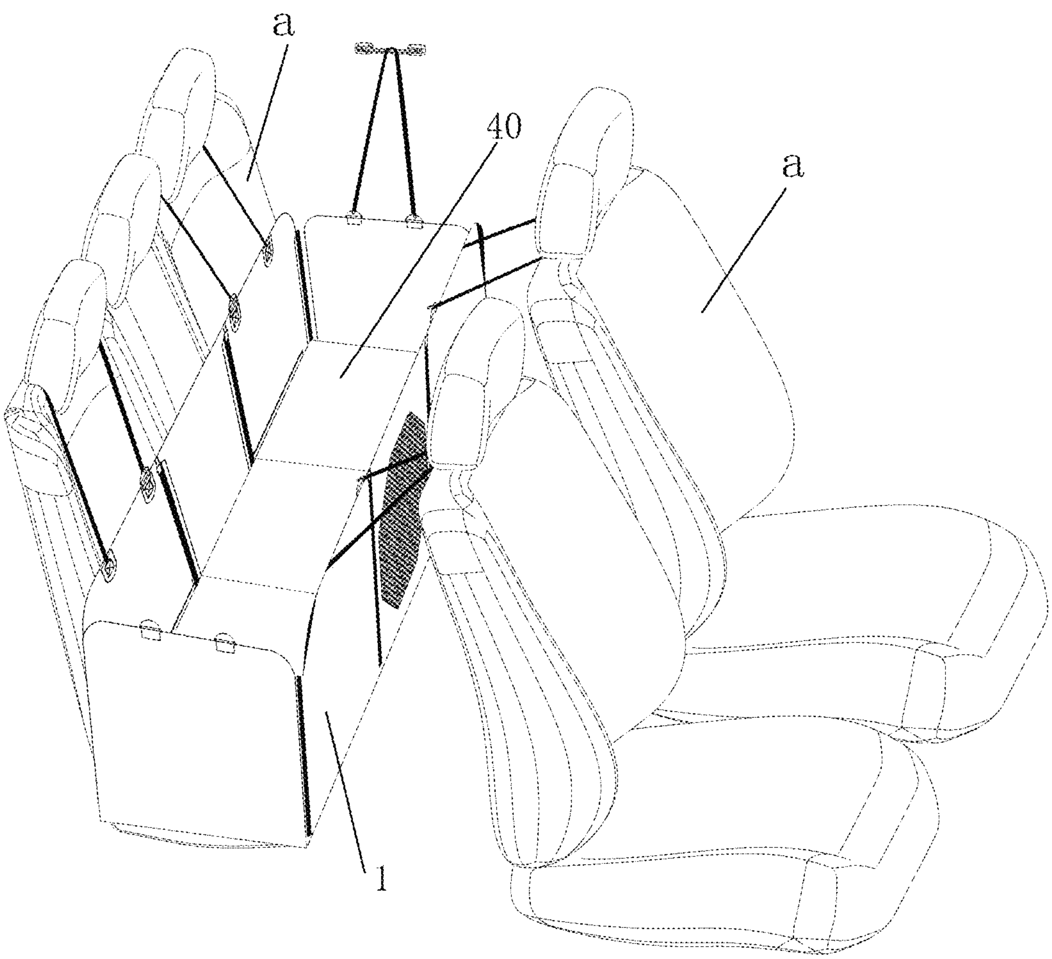
FIG. 7 is a use state diagram of a cushion cavity of a pet cushion according to a preferred embodiment of the present invention folded into a size space of three vehicle seats.
Figure 8:
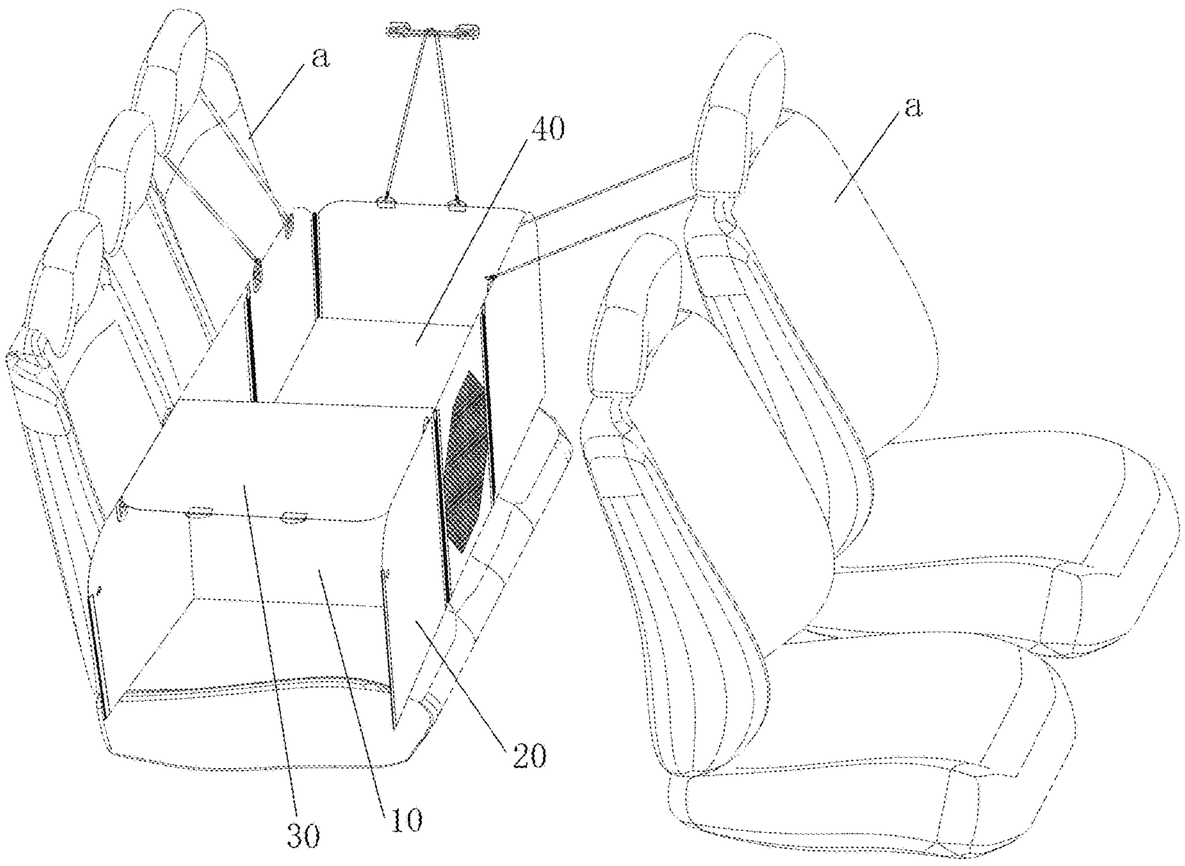
FIG. 8 is a schematic diagram showing an open state of a cushion cavity of a pet cushion according to a preferred embodiment of the present invention folded into a size space of two vehicle seats.

As shown in FIGS. 1-8, a pet cushion 1 suitable for a vehicle seat a includes a bottom cushion 10, a first side cushion 20 and a second side cushion 30. A plurality of the bottom cushions 10 are provided and connected, and a first folding part 50 is provided at a connection among the plurality of bottom cushions 10, so that the plurality of bottom cushions 10 can be folded or unfolded along the first folding part 50, the two bottom cushions 10 can be turned over to be perpendicular to each other, and one or two of the bottom cushions 10 can be used as side cushions when turned up.

In the embodiment of the present application, one or more than two bottom cushions 10 may be provided according to a spatial area use requirement of the cushion cavity 40. For example, when three bottom cushions 10 are laid on the vehicle seat a, each bottom cushion 10 is laid corresponding to a position of one vehicle seat a, so that three bottom cushions 10 are arranged along the parallel direction of the vehicle seats a.

The sides of the bottom cushion 10 along the parallel direction of the vehicle seats a are front and rear sides, and the sides of the bottom cushion 10 close to side doors of a vehicle are left and right sides.

In addition, a surface of the bottom cushion 10 contacting the vehicle seat a is provided with an anti-slip layer. The anti-slip layer can increase the friction between the bottom cushion 10 and the vehicle seat a, prevent the bottom cushion 10 from slipping off the vehicle seat a, and improve the stability of the pet cushion 1 on the vehicle seat a.

The first side cushions 20 are integrally arranged on front and rear sides of the bottom cushion 10, and a second folding part 51 is arranged at a connection between the first side cushion 20 and the front and rear sides of the bottom cushion 10. Therefore, the first side cushion 20 and the bottom cushion 10 can be folded or unfolded along the second folding part 51, and the first side cushion 20 can be turned over to be perpendicular to the bottom cushion 10, so that the first side cushion 20 stands upright on the front and rear sides of the bottom cushion 10.

Each of the first side cushions 20 corresponds to one of the bottom cushions 10, so that the number of the first side cushions 20 provided on the front and rear sides of the bottom cushion 10 is the same as the number of the bottom cushions 10, and the number of the first side cushions 20 provided on the rear side of the bottom cushion 10 is the same as the number of the bottom cushions 10, thereby completely surrounding the front and rear sides of the bottom cushion 10.

In addition, a first connecting member 60 is arranged between two adjacent first side cushions 20 to achieve a detachable connection between the two first side cushions 20. The first connecting member 60 may be a zipper, a button, a hook and loop fastener or a magnet. Generally, the bottom cushion 10 needs to be folded to reduce the spatial area of the cushion cavity 40. Therefore, the first side cushion 20 near the edge is separated from the first side cushion 20 in the middle, and the first side cushion 20 near the edge is turned over to an outer side surface of the turned-over bottom cushion 10, so that the first side cushion 20 near the edge overlaps with the turned-over and upright bottom cushion 10.

Then, a second connecting member 61 is arranged between right-angle sides of the first side cushion 20 in the middle and the turned-over bottom cushion 10 at right angles to each other, so as to achieve a detachable connection between the first side cushion 20 and the bottom cushion 10. Therefore, the first side cushion 20 in the middle is turned over and then connected to the turned-over bottom cushion 10, so that the front and rear sides of the bottom cushion 10 can be surrounded by the first side cushion 20. The second connecting member 61 may use a zipper, a button, a hook and loop fastener or a magnet.

A storage pocket is provided on the first side cushion 20 to facilitate the user to carry some daily food and supplies necessary for the pets. A window 21 with a grid is provided on the first side cushion 20, so that the pets can observe the external environment through the window 21, and the user can also observe the status of the pets by the window 21.

The second side cushions 30 are integrally arranged on left and right sides of the bottom cushion 10, and a third folding part 52 is arranged at a connection between the second side cushion 30 and the left and right sides of the bottom cushion 10. Therefore, the second side cushion 30 and the bottom cushion 10 can be folded or unfolded along the third folding part 52, and the second side cushion 30 can be turned over to be perpendicular to the bottom cushion 10, so that the second side cushion 30 stands upright on the left and right sides of the bottom cushion 10.

In actual use, one second side cushion 30 is provided corresponding to the bottom cushion 10 near the edge. When a plurality of bottom cushions 10 are fully unfolded and laid, the second side cushion 30 is turned up and stands upright on an end side of the bottom cushion 10, the first side cushion 20 is also turned up and stands upright on the front and rear sides of the bottom cushion 10, and a third connecting member 62 is arranged between right-angle sides of the first side cushion 20 and the second side cushion 30 at right angles to each other. In this way, a detachable connection between the first side cushion 20 and the second side cushion 30 is achieved, and the front and rear sides and the left and right sides of the bottom cushion 10 are completely surrounded and then assembled into the cushion cavity 40 with an opening upward. The third connecting member 62 may use a zipper, a button, a hook and loop fastener or a magnet.

When the spatial area of the cushion cavity 40 needs to be reduced, and the bottom cushion 10 close to the edge is turned up to be perpendicular to the bottom cushion 10 in the middle, the bottom cushion 10 close to the edge is used as a side cushion of the bottom cushion 10 in the middle, so that the second side cushion 30 does not need to be used as a side cushion, the second side cushion 30 can be directly folded to an outer side surface of the upright bottom cushion 10, and the second side cushion 30 overlaps with the upright bottom cushion 10 and the first side cushion 20 turned over to the outer side surface of the upright bottom cushion 10.

To further prolong the service life of the pet cushion 1, the first folding part 50, the second folding part 51 and the third folding part 52 are all arranged as soft layers, so that the durability of the bottom cushion 10, the first side cushion 20 and the second side cushion 30 in the repeated folding and unfolding process is improved.

To improve the assembly stability of the pet cushion 1 on the vehicle seat a, a fastener 63 and/or a connecting belt 64 are provided on the outer sides of the bottom cushion 10, the first side cushion 20, and the second side cushion 30. During assembly, the pet cushion is connected to the vehicle handle and the vehicle seat a by the connecting belt 64, and the fastener 63 is used to add the connecting belt 64 or to facilitate connection with the other end of the connecting belt 64 when the cushion is folded or stored. In addition, a handle is arranged on one side of the first side cushion 20 connected to the bottom cushion 10, and after the pet cushion 1 is stored, a user can hold the handle by hand, so that the pet cushion is convenient to carry.

To keep the interior of the vehicle clean, the inner side surfaces of the bottom cushion 10, the first side cushion 20 and the second side cushion 30 contacting pets are provided with a waterproof layer. Moreover, to provide a more comfortable riding environment for pets, cushioning materials are filled inside the bottom cushion 10, the first side cushion 20 and the second side cushion 30 to improve the shock absorption effect of the pet cushion 1.

In this way, the bottom cushion 10, the first side cushion 20 and the second side cushion 30 are integrally connected, and the connections among the plurality of bottom cushions 10 and the connections between the bottom cushion 10 and the first side cushion 20 and the second side cushion 30 are provided with folding parts, so that the pet cushion 1 is unfolded or folded along the folding parts. Compared with the conventional implementation means where a bottom cushion 10 cannot be folded or a plurality of cushions need to be spliced and formed, the embodiment of the present application can improve the use convenience based on maintaining the integrity of the integral forming of the pet cushion 1, is easier and labor-saving in assembly, use and storage without repeated assembly, and thus has longer service life.

Moreover, when folding the pet cushion 1, a user can determine a spatial area of a cushion cavity 40 of the pet cushion 1 by selecting the number of bottom cushions 10 to be unfolded and laid, so as to meet a requirement of the user to freely switch to cushion cavities 40 with different spatial areas. Then the bottom cushion 10 and the right-angle side of the first side cushion 20, as well as the right-angle side of the first side cushion 20 and the right-angle side of the second side cushion 30 are connected to complete the assembly of the pet cushion 1. The operation is simple and convenient, and after the cushion is folded, people and pets can ride together in the back seat of the vehicle.

The above embodiments are only preferred embodiments of the present invention, and the scope of the present invention should not be limited thereby. Any insubstantial changes and substitutions made by those skilled in the art based on the present invention fall within the protection scope of the present invention.

The invention claimed is:

1. A pet cushion suitable for a vehicle seat, comprising:
   - a plurality of bottom cushions arranged continuously along a first direction, wherein two opposite sides extending along the first direction are respectively defined as a first side and a second side; one of the plurality of the bottom cushions which is closest to the first side is defined as a first bottom cushion, and another one of the plurality of the bottom cushions which is closest to the second side is defined as a second bottom cushion;
   - a plurality of side cushions including a first side cushion disposed in correspondence with the first bottom cushion and a second side cushion disposed in correspondence with the second bottom cushion;
   - a first end cushion configured to be connected to the first bottom cushion but not to be connected to any one of the side cushions when whole of the pet cushion is in an expansion state;

a second end cushion configured to be connected to the second bottom cushion but not to be connected to any one of the side cushions when the whole pet cushion is in the expansion state; and a first connector disposed between the first side cushion and a first-side adjacent side cushion adjacent to the first side cushion, and configured to detachably connect the first side cushion and the first-side adjacent side cushion by closing or opening the first connector; and wherein the pet cushion further comprises a second connector including a first half-connector and a second half-connector cooperating with the first half-connector of the second connector to enable opening or closing therebetween; the first half-connector of the second connector is located on a first boundary between the first bottom cushion and the first side cushion, and the second half-connector of the second connector is located on a first side edge of the first-side adjacent side cushion;

wherein the first connector includes a third half-connector independent from the second half-connector and a fourth half-connector cooperating with the third half-connector, the third half-connector is located on a first side edge of the first side cushion, and the fourth half-connector is located on the first side edge of the first-side adjacent side cushion;

wherein the first boundary overlaps a second side edge of the first side cushion, the second side edge of the first side cushion is adjacently connected to the first side edge of the first side cushion; and wherein the pet cushion is capable of operating in a first state that the first connector is in an open state while the second connector is in a closed state, the first side cushion is detachable from the first-side adjacent side cushion, and is configured to overlap the first bottom cushion to form a stacked structure, so that the third half-connector is separated from the first half-connector and the fourth half-connector, the first-side adjacent side cushion is directly connected to the first bottom cushion, and both the first-side adjacent side cushion and the first bottom cushion are erected relative to a bottom of the pet cushion.

2. The pet cushion according to claim 1, wherein an inner surface of the pet cushion configured to contact a pet is provided with a waterproof layer, and an interior of the pet cushion is filled with a cushioning material.

3. The pet cushion according to claim 1, wherein a surface of the plurality of bottom cushions configured to contact the vehicle seat is provided with an anti-slip layer.

4. The pet cushion according to claim 1, wherein the plurality of side cushions are provided with a storage pocket and a window with a grid.

5. The pet cushion according to claim 1, wherein outer sides of the plurality of bottom cushions, the plurality of side cushions, the first end cushion and the second end cushion are all provided with fasteners and/or connecting belts, and a handle is provided onsides of the plurality of side cushions connected to the plurality of bottom cushions.

6. The pet cushion according to claim 1, further comprising a fourth connector disposed between the second side cushion and a second-side adjacent side cushion adjacent to the second side cushion; and configured to detachably connect the second side cushion and the second-side adjacent side cushion to the second side cushion by closing or opening the fourth connector; and a third connector including a fifth half-connector and a sixth half-connector cooperating with the fifth half-connector of the third connector to enable opening or closing therebetween;

wherein the fifth half-connector of the third connector is located on a second boundary between the second bottom cushion and the second side cushion, and the sixth half-connector of the third connector is located on a first side edge of the second-side adjacent side cushion; and wherein the fourth connector includes a seventh half-connector independent from the sixth half-connector and located on a first side edge of the second side cushion, and an eighth half-connector located on the first side edge of the second-side adjacent side cushion; and the second boundary overlaps a second side edge of the second side cushion, the second side edge of the second side cushion being adjacently connected to the first side edge of the second side cushion.

7. The pet cushion according to claim 6, wherein the pet cushion is capable of operating in a second state that the third connector is in the closed state while the fourth connector is in the open state, the second side cushion is detachable from the second-side adjacent side cushion, and is configurable to overlap the second bottom cushion to form a stacked structure, so that the seventh half-connector is separated from the fifth half-connector and the eighth half-connector, the second-side adjacent side cushion is directly connected to the second bottom cushion, and both the second-side adjacent side cushion and the second bottom cushion are erected relative to the bottom of the pet cushion.

8. The pet cushion according to claim 7, further comprising a sixth connector including two halves, wherein a half of the sixth connector is located on a first side edge of the second end cushion, and the other half of the sixth connector is located on a first side edge of the second side cushion opposite the first side edge of the second-side adjacent side cushion, the first side edge of the second end cushion and the first side edge of the second side cushion are located on two right-angle sides of a same right angle.

9. The pet cushion according to claim 8, wherein the pet cushion is capable of operating in a fourth state that the sixth connector and the fourth connector are in the closed state while the third connector is in the open state, the second end cushion, the second bottom cushion and the second side cushion form a corner.

10. The pet cushion according to claim 9, wherein when the pet cushion is operated in the first state and the second state, a first cushion cavity with a first set spatial area is defined by the pet cushion.

11. The pet cushion according to claim 10, wherein when the pet cushion is operated in the first state and the fourth state, a second cushion cavity with a second set spatial area greater than the first set spatial area is defined by the pet cushion.

12. The pet cushion according to claim 6, wherein the first connector and the fourth connector are located on two opposite sides of a same one of the side cushions respectively.

13. The pet cushion according to claim 1, further comprising a fifth connector including two halves, wherein a half of the fifth connector is located on a first side edge of the first end cushion, and the other half of the fifth connector is located on a first side edge of the first side cushion opposite to the first side edge of the first-side adjacent side cushion, and the first side edge of the first end cushion and the first side edge of the first side cushion are located on two right-angle sides of a same right angle.

14. The pet cushion according to claim 13, wherein the pet cushion is capable of operating in a third state that the fifth connector and the first connector are in the closed state while the second connector is in the open state, the first end cushion, the first bottom cushion and the first side cushion form a corner.

15. The pet cushion according to claim 1, wherein the first connector and the second connector are both entirely a same connector chosen from: a zipper, a button, a hook and loop fastener, and a magnet.

16. The pet cushion according to claim 1, wherein the first connector and the second connector are both zippers.

17. The pet cushion according to claim 1, wherein the second half-connector of the second connector extends along an entire length of the first side edge of the first-side adjacent side cushion, the fourth half-connector of the first connector extends along the entire length of the first side edge of the first-side adjacent side cushion, and the second half-connector of the second connector is spaced apart from the fourth half-connector of the first connector.

18. The pet cushion according to claim 1, wherein the pet cushion is capable of operating in a fifth state that the first connector is in a closed state while the second connector is in an open state, the first half-connector and the second half-connector being opened to form a right angle.

* * * * *